United States Patent
Cong

(10) Patent No.: US 9,392,041 B2
(45) Date of Patent: Jul. 12, 2016

(54) DELIVERY OF TWO-WAY INTERACTIVE CONTENT

(75) Inventor: Chong Cong, Shanghai (CN)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 14/236,874

(22) PCT Filed: Aug. 3, 2011

(86) PCT No.: PCT/CN2011/077953
§ 371 (c)(1),
(2), (4) Date: Feb. 3, 2014

(87) PCT Pub. No.: WO2013/016869
PCT Pub. Date: Feb. 7, 2013

(65) Prior Publication Data
US 2014/0181212 A1    Jun. 26, 2014

(51) Int. Cl.
*G06F 15/16* (2006.01)
*H04L 29/06* (2006.01)
*G06F 17/30* (2006.01)

(52) U.S. Cl.
CPC .......... *H04L 65/403* (2013.01); *G06F 17/3087* (2013.01)

(58) Field of Classification Search
USPC ......................................... 709/204, 226, 203
See application file for complete search history.

(56) References Cited

U.S. PATENT DOCUMENTS

| | | | |
|---|---|---|---|
| 2002/0091925 A1* | 7/2002 | Suzuki | G06F 21/10 713/168 |
| 2008/0140523 A1* | 6/2008 | Mahoney | G06Q 30/0256 705/14.54 |
| 2011/0131106 A1 | 6/2011 | Eberstadt et al. | |
| 2012/0136997 A1* | 5/2012 | Yan | G06Q 10/06313 709/225 |

FOREIGN PATENT DOCUMENTS

| CN | 1363906 | 8/2002 |
|---|---|---|
| CN | 101350914 | 1/2009 |
| CN | 101438267 | 5/2009 |

OTHER PUBLICATIONS

International Search Report and Written Opinion in International Application No. PCT/CN2011/077953, mailed May 3, 2012, 11 pages.
International Preliminary Report on Patentability in International Application No. PCT/CN2011/077953, mailed Feb. 4, 2014, 7 pages.

* cited by examiner

*Primary Examiner* — El Hadji Sall
(74) *Attorney, Agent, or Firm* — Foley & Lardner LLP; John D. Lanza

(57) ABSTRACT

Among other disclosed subject matter, a computer-implemented method includes a receiving a request for content from a user device. The method also includes selecting a content item for delivery responsive to the request. The method also includes providing a two-way communication interface for a user to communicate with a third party content provider associated with the content item along with the selected content item.

20 Claims, 6 Drawing Sheets

DELIVERY OF TWO-WAY INTERACTIVE CONTENT

BACKGROUND

This document relates to delivering information.

Content items can be placed on or included with documents that are distributed to consumers of content on the Internet. Such content items can be selected by a selection engine that receives keywords or other query terms or other information as an input. The selection engine in turn selects content items that match or otherwise are associated with the provided query terms.

The content items can include various forms of content. For example, online content can include various types of resources, such as text based documents, image based content, multi-media content, etc. The online content can be delivered to a user as part of another resource, such as a search engine results page, a news article or other web page.

SUMMARY

This document describes techniques for delivering online content, including delivering a two-way communication interface in conjunction with the content.

In one aspect, a computer-implemented method includes receiving a request for content from a user device. The method also includes selecting a content item for delivery responsive to the request. The method also includes providing a two-way communication interface for a user to communicate with a third party content provider associated with the content item along with the selected content item.

In another aspect, a computer-implemented method includes receiving a request for a content provider. The method also includes selecting a particular content provider from a plurality of content providers. The particular content provider is responsive to the request. The method also includes providing a two-way communication interface for a user to communicate with a particular content provider associated with a two-way communication account in response to the request. The two-way communication account comprises at least one keyword that is responsive to the search query and an online status indicator. The online status indicator has a value indicative of whether the content provider is available to communicate with the user.

These and other embodiments can each optionally include one or more of the following features. The methods can include determining a geographic area associated with the search query. The methods can include providing the two-way communication interface by providing the two-way communication interface if the third party content provider provides services in the geographic area. The methods can include determining the geographic area by determining the geographic area associated with an IP address from which the search query originated. The geographic area can include a user-specified geographic area provided with the search query. The two-way communication interface can include an instant messaging interface.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Systems and methods are described for delivery of two-way interactive content. A content delivery system receives a request for content, such as a request for an advertisement. The content delivery system selects content based on the request and determines whether the content provider associated with the selected content is associated with a two-way communication account. For example, the content delivery system can determine whether the content provider is associated with an instant-messaging account. If the content provider is associated with a two-way communication account and the content provider is available to participate in the two-way communication session, the content delivery system provides the content along with an interface to conduct a two-way communication session. For example, the content delivery system can provide an indicator that represents the content provider is available and a text entry field to receive text entered by a user.

Advantageously, the described system may provide for one or more benefits, such as the ability to provide a user with an interface to communicate with a content provider. For example, the user can ask questions or seek additional information from the content provider. This allows the user to receive answers to the user's specific questions and/or information requested by the user. In addition, the interface can be used by the content provider as an additional tool for the content provider to market their products, services or information.

Figure 1:
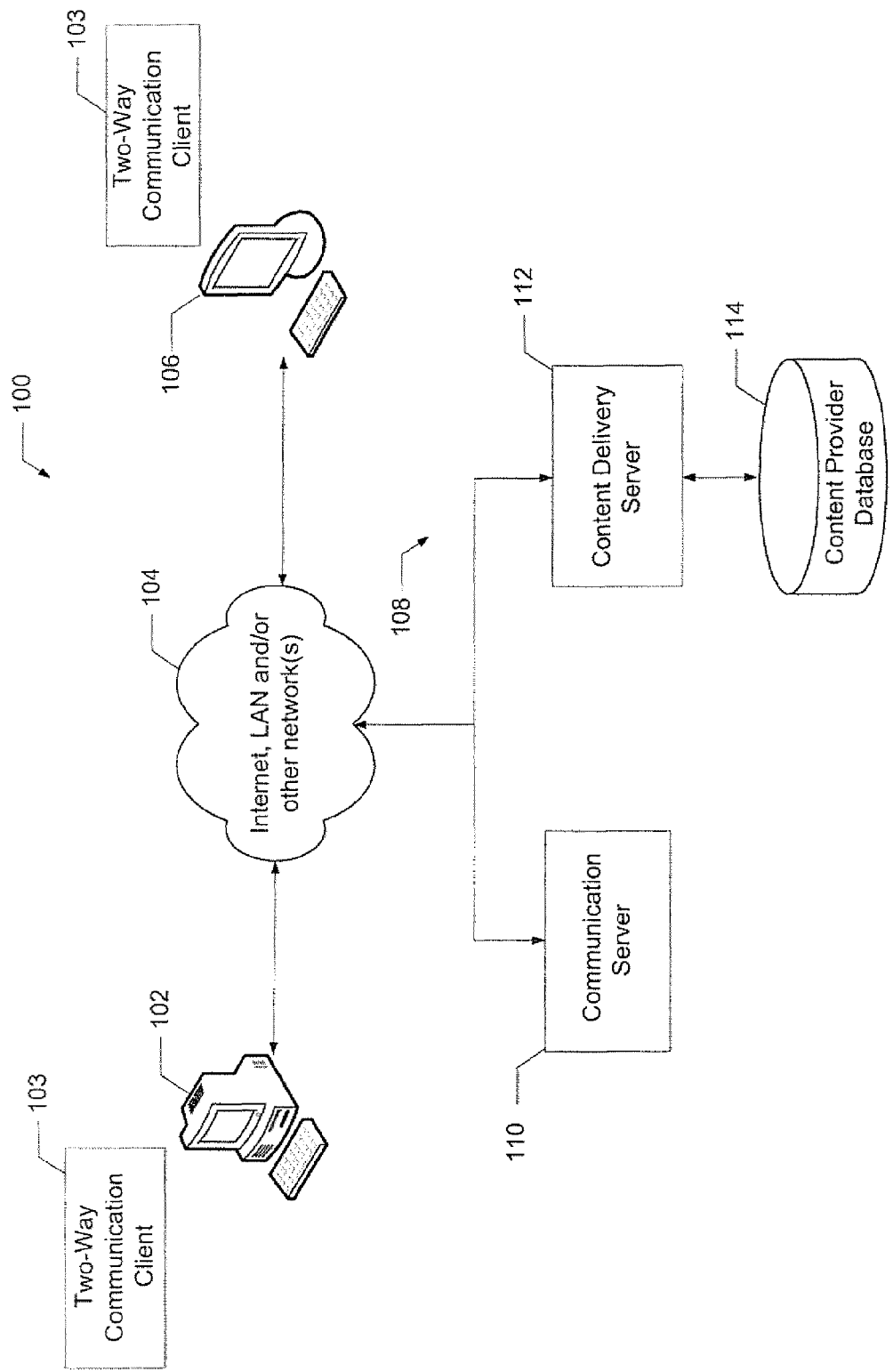
FIG. 1 is a block diagram of an example environment for delivering two-way interactive content.

FIG. 1 is a block diagram of an example environment 100 for delivering two-way interactive content. The environment 100 includes a user device 102, a network 104, a content provider device 106, a content delivery system 108 and a communication server 110.

The user device 102 can be any type of device capable of accessing the network 104. For example, the user device 102 can be a computer, a laptop, a tablet computer or a smart phone. The user device 102 can be used to transmit requests for online content, such as a search query or a request for online content (e.g., an advertisement request), to the content delivery system 108 and receive online content that is responsive to the request. For example, the user device 102 can transmit a search request accompanied by a request for an advertisement to the content delivery system 108 and receive a search engine results page that includes online advertisements (e.g., text ads, image ads, dynamic ads, etc.). The user device 102 can display the search engine results page and allow the user of the user device 102 to interact with the online advertisement. For example, the user of the user device 102 can click on a link associated with the online advertisement or initiate a two-way communication session, which is explained below.

In some implementations, the request for online content can include geographic information associated with the user device 102. For example, the request for online content can include a user specified location or can include an IP address associated with the user device 102, which can be used to determine geographic location.

The network 104 can be any type of network such as a local area network (LAN), wide area network (WAN), the Internet, or a combination thereof. The network 104 facilitates connectivity between the user device 102, the content provider device 106, the communication server 107 and the content delivery system 108.

The content provider device 106 can be similar to the user device 102 and be any type of device capable of accessing the network 104. The content provider device 106 can be operated by a content provider or a representative of the content provider. For example, the content provider device 106 can be operated by a sales associate or customer service representative associated with the content provider. Although FIG. 1 illustrates a single content provider device 106, the environment 100 can include multiple content provider devices 106 each associated with the same content provider or associated with different content providers.

The user device 102 and the content provider device 106 can also include or be associated with a two-way communication client 103. The two-way communication client 103 can provide an interface for the user of the user device 102 or content provider device 106 to participate in a two-way communication session hosted by the communication server 110. For example, in some implementations, the two-way communication client 103 can be an instant-messaging program that allows for a communications between user devices 102 and/or content provider devices 106. In some implementations, the two-way communication client 103 can allow for text based communications. In some implementations, the two-way communication client 103 can allow for multi-media communications, such as video and/or audio communications. In some implementations, the two-way communication client 103 can support various instant messaging protocols and other communication protocols.

The two-way communication client 103 interacts with the communication server 110 to provide for the two-way communication sessions with another two-way communication client, such as the content provider device's two-way communication client 103. In some implementations, the server 110 can be configured to use various communication protocols and various messaging protocols. The two-way communication server 110 can store user accounts associated with users of the client 103. For example, users of the two-way communication client 103 can register for a user account and a screen-name or other identifier. The communication server 110 can also store contacts associated with a user account. For example, the communication server 110 can store the screen-names that a user communicates regularly or screen-names associated with a user's address book or contact list.

In addition, the server 110 can detect an online status associated with the client 103. For example, the communication server 110 can determine whether the clients 103 are available to participate in a two-way communication session, whether the clients 103 have been idle for some predetermined amount of time, whether the clients 103 are busy and/or whether the clients 103 are offline. In some implementations, the server 110 determines the online status by receiving user specified statuses. For example, a user of the user device 102 can specify his online status to be "busy." In some implementations, the server 110 can determine the online status by analyzing data received from the clients 103. For example, the client 103 can transmit data such as the period of time elapsed since the user last interacted with the client 103 or the user device 103. If the period of time is greater than a threshold time value, the server 110 can determine that the online status is "idle."

In addition, the communication server 110 can associate particular words with a user account. For example, a content provider 106 can associate keywords related to products and/or services that the content provider provides with a given content provider 106. The keywords can be used by the communication server 110 and/or the content delivery system 108 to identify or select online content or a content provider. In some implementations, the communications server 110 can also associate geographic areas with a user account. For example, a content provider can operate in a particular geographic area, such as Boston or New Jersey, and can have the geographic area associated with its user account.

The content delivery system 108 can receive the requests for content from the user device 102 and deliver content that is responsive to the request. The content delivery system 108 can include a content delivery server 112 and a content provider database 114.

The content delivery server 112 can receive the request for content from the user device 102 and identify content that is responsive to the request. For example, the user device 102 can transmit a request for content based on a search query provided by the user of the user device 102. The content delivery server 112 can select content that is related to the search query and provide the content to the user device 102. In some implementations, the content delivery server 112 receives the search query, identifies keywords in the search query and analyzes the content provider database 114 to identify online content that is related to the keyword. In some implementations, the content delivery server 112 can communicate with the communications server 110 to identify content providers related to the keywords. Various methods can be used to identify the online content that is related to the keywords. In addition, other factors can be used to determine which online content is selected. For example, a quality score associated with the content provider and/or the content can be used in conjunction with the keyword to select the online content to be provided to the user device 102. In addition, a geographic area associated with the online content and/or content provider can be used to identify online content responsive to the request. For example, the content delivery server 112 can identify online content associated with a content provider that offers products and/or services in a geographical area near the user. In some implementations, the content delivery server 112 can analyze the IP address associated with the user's request for content and/or geography information provided by the user to geographical information associated with the content and/or the content provider to determine whether the user is within a predetermined distance from the content provider. For example, the content delivery server 112 can determine whether the user is within 50 miles of the content provider. Other measures of geographical proximity can be used, such as zip codes, counties or states. The user can choose to opt-out of providing the geographic information to the content delivery server 112.

The content provider database 114 can be any type of memory or database to store information associated with a content provider and online content associated with the content provider. For example, the content provider database 114 can store online advertisements associated with the content provider and keywords associated with each advertisement. Other types of content are possible. In some implementations, the content provider selects which keywords are associated with each advertisement. For example, a large electronics retailer can be associated with several different advertisements (e.g., an advertisement for TVs, an advertisement for cameras, and an advertisement for home appliances) and provide different keywords to be associated with each of the advertisements.

In addition, the content provider database 114 can store screen names associated with the content provider. For example, the content provider database 114 can store a screen name associated with the content provider or can store a plurality of screen names associated with the content provider (e.g., one screen name for each of the content provider's customer service representative).

After the content delivery system 108 identifies content that is related to the request, the content delivery system 108 can interact with the communication server 110 to determine whether the content provider associated with the selected content (i.e. the selected content provider) is available for a two-way communication session. For example, the content delivery system 108 can provide the screen name associated with the selected content provider to the communication server 110 to determine whether the selected content provider is available to participate in a two-way communication session. If the selected content provider is available, the content delivery system 108 can provide an indicator of the content provider's online status and an interface to initiate the two-way communication session.

In some implementations, the content delivery system 108 can collect content provider statistics. For example, the content delivery system 108 can collect statistics such as the number of times a two-way communication interface associated with a particular content provider has been provided to users, the number of times the content provider has participated in a two-way communication session with users, the duration of each two-way communication session, etc. The content delivery system 108 can provide collect the data over a period of time and provide a report that includes the data to the content providers.

Figure 2:
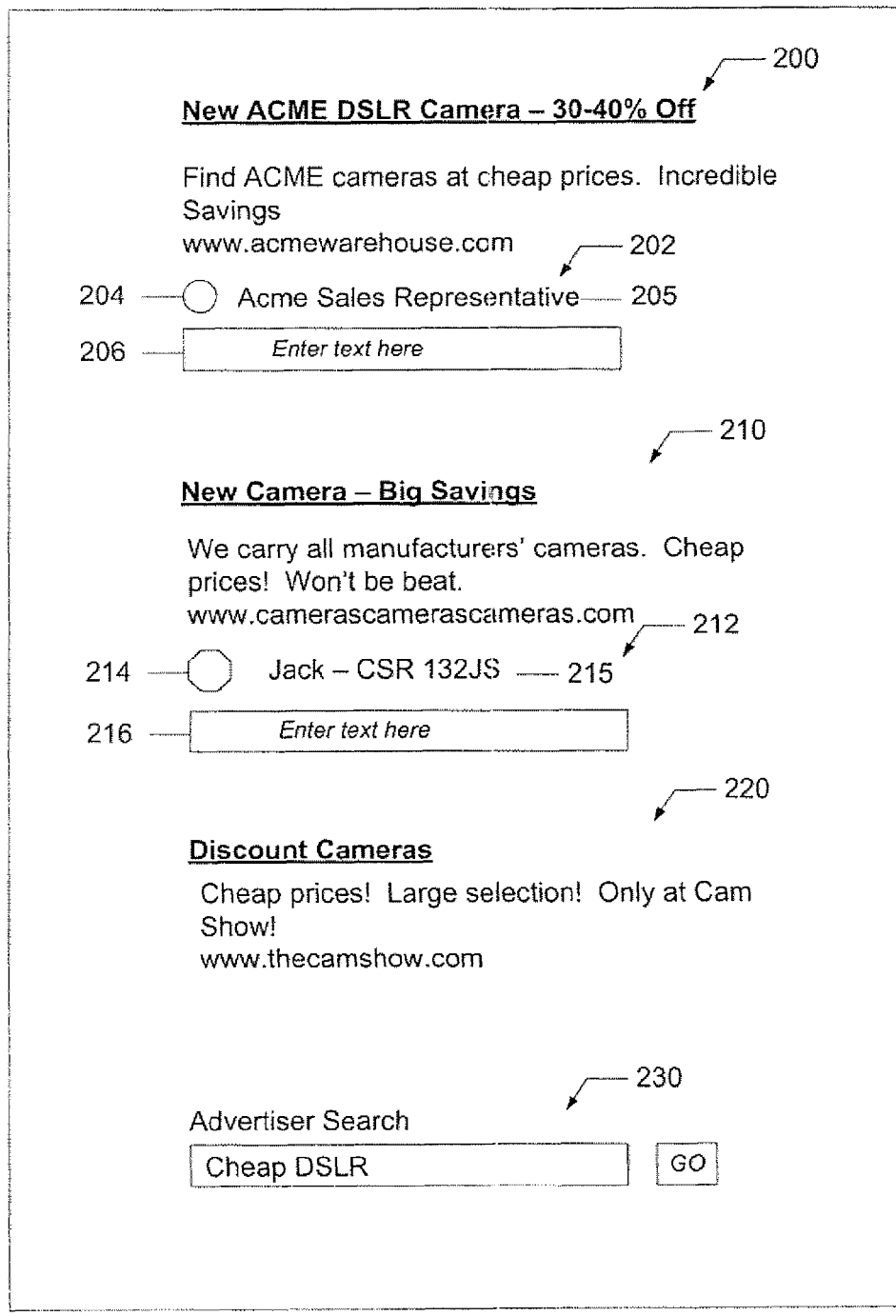
FIG. 2 is an illustration of example online content that includes a two-way communication interface.

FIG. 2 provides an illustration of an example portion of a search engine results page that includes online content 200, 210 and 220 and a content provider search field 230. As illustrated in FIG. 2, the online content 200, 210 and 220 can be a text based advertisement that includes a two-way communication interface 202. In some implementations, the online content can be image based content, multimedia content and/or dynamic content. The two-way communication interface 202 includes an online status indicator 204, a screen name 205 that is associated with the content provider (Acme Warehouse) and a two-way communication input 206. As explained above, the content delivery system identifies the online content 200 to be responsive to a request for content that it received from the user device 102. The online content 200 can be displayed on the user device as part of a search engine results page or as part of another application.

The online status indicator 204 can be displayed next to or near the screen name 205 associated with the two-way communication account. The online status indicator 204 can represent whether the content provider (or a representative of the content provider) associated with the screen name is available for a two-way communication session. For example, the online status indicator 204 can be displayed in different colors and shapes to represent the content provider's different statuses. Table 1 provides example online status indicators 204.

TABLE 1

| Online status indicator | Content provider's status |
| --- | --- |
| A green circle | Content provider is available for two-way communication session |

TABLE 1-continued

| A yellow circle or a yield sign | Content provider is online but is currently idle |
| --- | --- |
| A red circle or a stop sign | Content provider is online but is currently busy or otherwise unavailable |

The online content 200 can also include the two-way communication input 206 for a user of the user device 102 to communicate with the content provider. For example, the two-way communication input 206 can be a text input field to receive the user's text based communications. In some implementations, after text is entered into the two-way communication input 206, a separate window is opened to display the messages sent by the user and the content provider. In some implementations, the two-way communication input 206 can be a video or audio interface. For example, the two-way communication input 206 can be a button in the shape of a video camera or microphone that the user can click to launch a video or audio interface for a video based communication session.

The online content 210 is similar to online content 200. Online content 210 includes a two-way communication interface 212 that includes a status indicator 214, a screen name 215 and a two-way communication input 216. As illustrated in FIG. 2, the online status indicator 214 is displayed as a hexagon or stop sign, which indicates that the content provider (or content provider's representative) is online but not available to participate in a two-way communication session with the user.

The online content 220 is a text based advertisement that does not include an online status indicator, a screen name or a two-way communication input. In some implementations, the online status indicator, the screen name and/or the two-way communication input can be hidden or not displayed because the content provider is offline. In some implementations, the online status indicator, the screen name and/or the two-way communication input can be hidden or not displayed because the content provider is not associated with a screen name or does not have a user account associated with the communication server 110.

In some implementations, the search engine results page can include a content provider search field 230. The content provider search field 230 allows a user of the user device 102 enter a provider query to search for a content provider that can participate in a two-way communication session. In some implementations, the provider query can include search terms related to a product or service. In some implementations, the provider query can be for query for a particular content provider. For example, a user can enter "Cam Show" to search for the content provider "Cam Show."

In some implementations, the provider search field 230 can be independent of the search engine results page. For example, the provider search field 230 can be on its own page (e.g., a provider search page) or can be part of a map or geographical-based search page (e.g., an online map.

The provider query allows the user to search for a content provider associated with keywords that are responsive to the provider query and that has a representative who is logged into the communication server 110 (i.e., online). For example, a user can search for a content provider that has an online status indicator equal to "available" and associated with keywords, such as "camping equipment" and "rental" or can search for a particular content provider, such as "Camping Outlet." In addition to being responsive to the provider query, the identified content provider can be a content provider whose online status indicator indicates that the content provider (or a representative of the content provider) is available and is not idle, busy or offline. In some implementations, the user can search for a content provider and specify the online status indicators acceptable to the user. For example, a user can search for a content provider associated with keywords "canoe," "life vest," and "stove" and specify that content providers associated with online status indicators equal to "available" or "idle" should be returned by the provider query.

Figure 3:
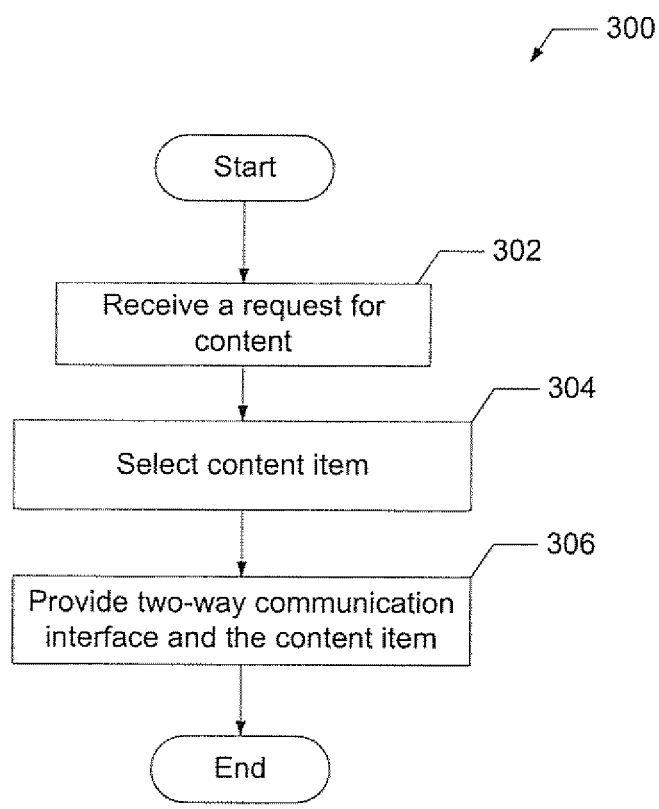
FIG. 3 is an illustration of an example process for delivering the two-way interactive content.

FIG. 3 is an illustration of an example process 300 for delivering the two-way interactive content. The process 300 begins by receiving a request for content (at 302). For example, a search query and an accompanying advertisement request can be transmitted from the user device 102 and received at the content delivery system 108. In some implementations, the advertisement request can be a request for an advertisement that is related to the search query. For example, the advertisement request can be a request for one or more advertisements that include a particular word or phrase that is included in the search query or otherwise related to the search query. As an example, if the user provides a search query of "Cankon D5D camera," the request for an advertisement can include the "Cankon" or "Cankon camera" or some other relevant terms from the search query.

After the request for content has been received, one or more content items are selected (at 304). For example, the content delivery server 112 can analyze the content provider database 114 and identify a content item that is responsive to the request for content (e.g., the advertisement request). The content delivery server 112 can identify a content item based, at least in part, on the keywords included in the content item request. In some implementations, the content delivery server 112 can also identify a content item based on quality scores associated with the content item and/or content provider. In some implementations, the content delivery server 112 also selects a content item based on whether the content provider is associated with a screen name and whether the account associated with the screen name is currently logged into the two-way communication server 110. For example, the content delivery server 112 can select a content item that is associated with a screen name and query the communication server 110 to determine whether the user associated with the screen name is online.

The selected content item(s) and a two-way communication interface can be provided to the user device (at 306). For example, the content delivery system 108 can provide the selected content item and the two-way communication interface to the user device 102, which can display the selected content item and the two-way communication interface as part of a search engine results page or as part of an application configured to display search results. A user of the user device 102 can then initiate a two-way communication session with the content provider using the two-way communication interface.

Figure 4:
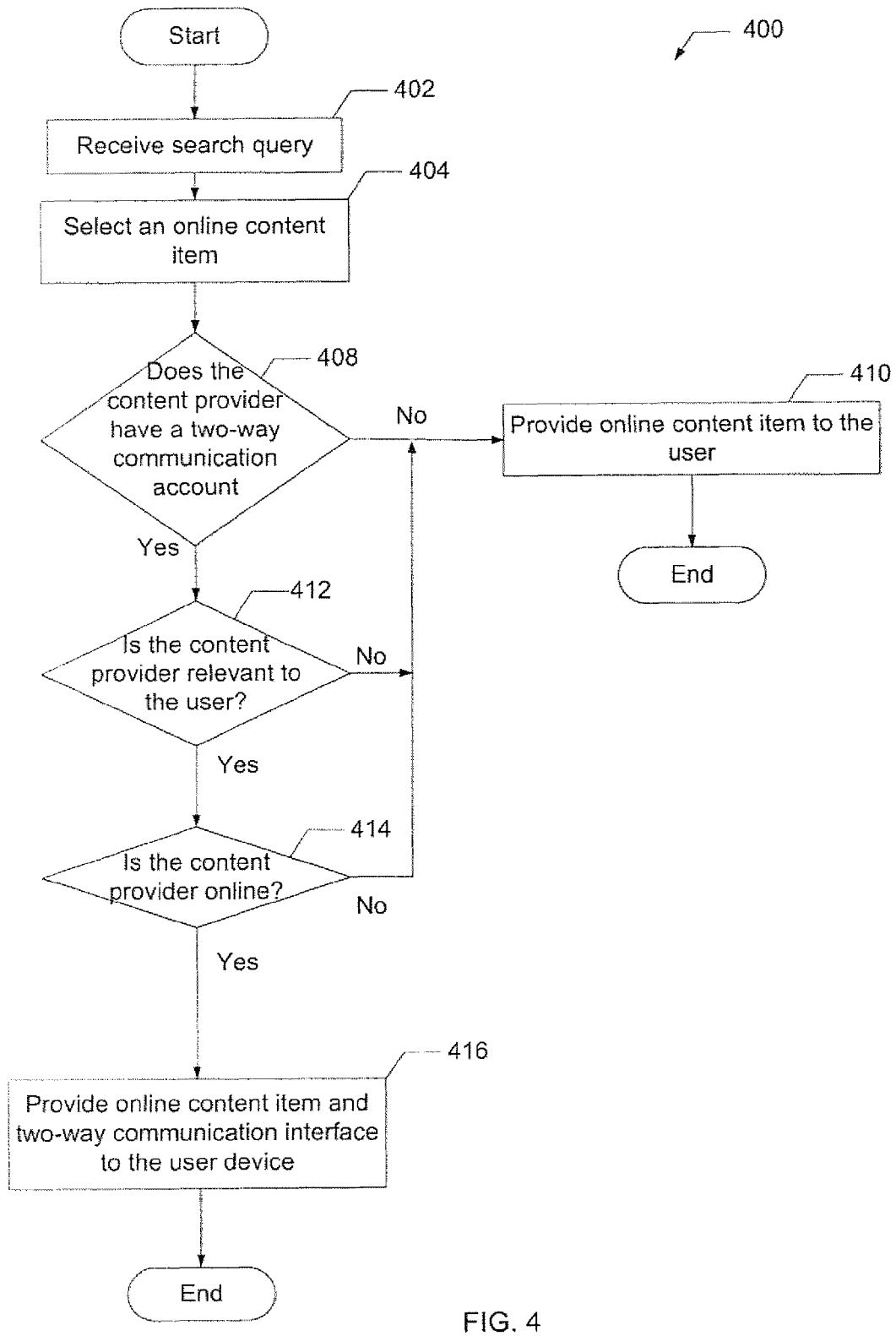
FIG. 4 is an illustration of an example process for delivering the two-way interactive content.

FIG. 4 is an illustration of an example process 400 for delivering the two-way interactive content. The process begins by receiving a search query (at 402). For example, a user of the user device 102 can provide a search query to the content delivery system 108. In some implementations, the user device 102 generates a content request (e.g., an advertisement request) that is transmitted to the content delivery system 108 along with the search query. In some implementations, the search query is received at a search system, which provides an online content request to the content delivery system 108. The online content request can be a request for advertisements that are related to the search query. For example, in some implementations, the content request will include particular words or phrases that are included in the search query. In some implementations, the content request will include a request for a particular content provider's content based on the search query.

One or more online content items are selected (at 404). For example, the content delivery server 112 can receive the content request and select one or more content items from the content provider database 114 that is responsive to the request. In some implementations, the content delivery server 112 selects content items that are associated with keywords included in the search query and/or content item request. In some implementations, the content delivery server 112 selects content items based on additional factors such as a quality score associated with the content provider and/or an content item.

After an online content item is selected, the content delivery server determines whether the content provider associated with the content item is associated with a two-way communication account (at 408). For example, the content delivery server 112 can analyze information stored in the content provider database 114 to determine whether the content provider is associated with a screen name. In some implementations, the content provider can be associated with more than one screen name. For example, each sales representative or customer service representative associated with the content provider can have a unique screen name and these screen names are associated with the content provider.

If the selected content provider is not associated with a screen name, then the content item is delivered to the user device 102 (at 410). For example, an advertisement can be delivered to the user device 102 as part of a search engine results page and does not include a two-way communication interface. FIG. 2 illustrates an example advertisement 220 that does not include a two-way communication interface.

If the selected content provider is associated with a screen name, the content delivery server 112 determines if the content provider is relevant to the user (at 412). For example, the content delivery server 112 can determine geographic areas associated with the content provider by analyzing geographic information associated with the content provider stored in the communication server or geographical information associated with the content item. The content delivery server 112 can determine if the content provider is near the user by comparing geographic information associated with the user (e.g., geographic information determined from IP address or geographic information provided by the user) and the geographic information associated with the content provider 106. In some implementations, the geographic information associated with the user can be determined from GPS data, cellular telephone signals and/or data from cellular telephone towers. If the user is not in the same geographic location as the content provider or greater than a predetermined distance of the content provider (e.g., 50 miles), the online content is provided to the user without a two-way communication interface (at 410). In some implementations, if the user is not in the same geographical area as the selected content provider, a different content item is selected (at 404). In addition to using geographic data to determine if a content provider is relevant to the user, the content delivery server 112 can analyze information stored in a cookie file associated with the user's web browser to determine information such as user interests and/or the user's search history and use this information to determine whether a content provider is relevant to the user. In some implementations, the content delivery server 112 can use information associated with the user's contact list (e.g., the user's contacts or other content providers the user previously contacted) to determine if a content provider is relevant to the user.

If the user is in the same geographic location as the content provider or less than a predetermined distance of the content provider, the content delivery server 112 determines whether the content provider is online (e.g., available, idle, busy, etc.) (at 414). If the content provider is not online, then the content item is delivered to the user device without a two-way communication interface (at 410). In some implementations, the content item is delivered without a two-way communication interface if the content provider is idle, busy or offline.

If the content provider is online, then the content delivery system provides the online content item and a two way communication interface to the user device (at 416). For example, the content delivery system 108 can provide the selected advertisement 200 or advertisement 210 to the user device 102 for display on a search engine results page or as part of another webpage or application. In some implementations, the content delivery system 108 can provide the selected advertisement 200 or 210 to a search engine for inclusion in the search engine results page.

Figure 5:
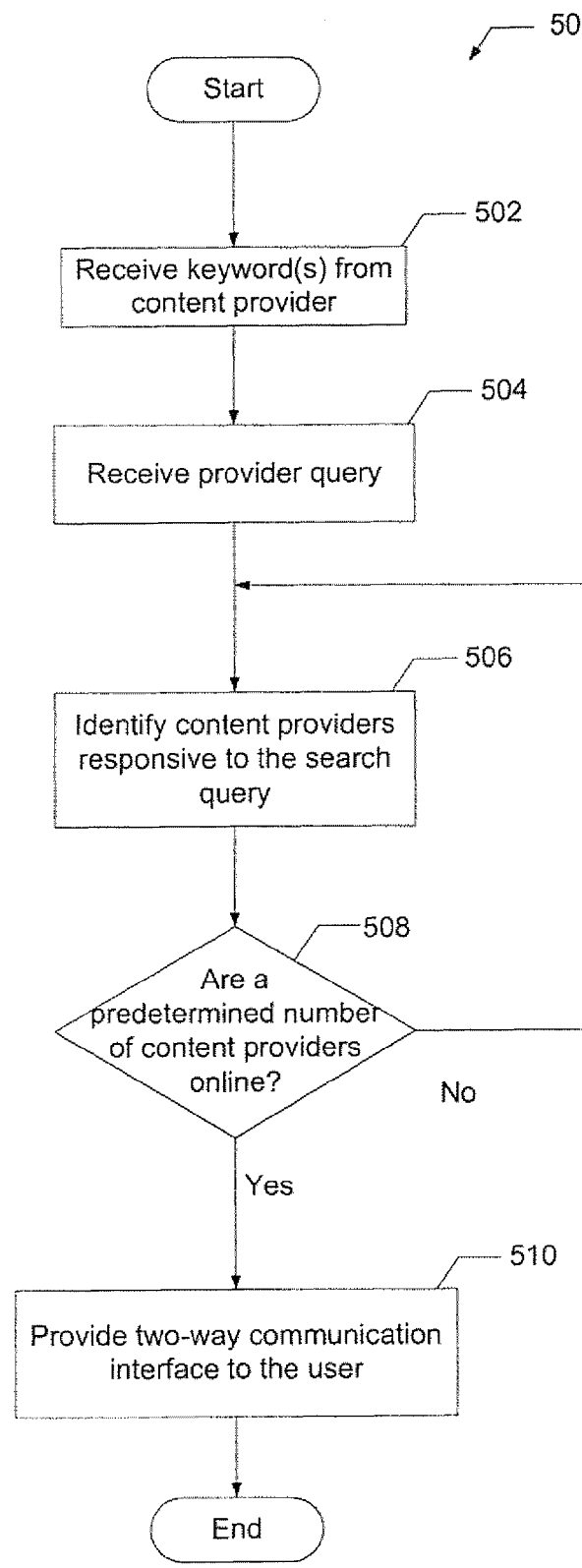
FIG. 5 is an illustration of an example process for searching for a content provider.

FIG. 5 is an illustration of an example process 500 for searching for a content provider. The process 500 begins by receiving a keyword or multiple keywords to be associated with the content provider (at 502). For example, the content provider can instruct the content delivery server 112 and/or the content provider database 114 to store particular keywords with which the content provider and/or its content items should be associated. As an example, the content provider Cam Show can instruct the content delivery server 112 to store keywords such as "cameras," "DSLR," "point and shoot," and "Cankon" or other manufacturer's names or camera models. The content delivery server 112 can associate the keyword(s) with the content provider and store the keyword(s) in the content provider database 114. In some implementations, the content delivery server 112 provides the keywords to the communication server 110, which associates the keywords with the content provider's screen name.

A provider query is received (at 504). For example, the provider query can be transmitted from the content provider search field 230 and can be received at the content delivery system 108. The provider query can include one or more keywords (e.g., camera, discount, Cankon).

A set of content providers that are responsive to the provider query is identified (at 506). For example, the content delivery server 112 can analyze the content provider database 114 to identify one or more content providers that are associated with the keyword. In some implementations, the one or more content providers are identified based on the keyword and other factors, such as a quality score or other metric. In addition, the geographical location of the user can be used to select a content provider near the user. The set of content providers can be ranked based on how responsive each content provider is to the provider query.

The set of content providers' online statuses are analyzed to determine whether a predetermined number of content providers (or representatives associated with the content provider) are online and available to participate in a two-way communication session (at 508). For example, the content delivery system 108 can query the communication server 110 to determine whether at least one content provider is online. The communication server 110 can analyze the screen name(s) associated with the content provider to determine if any of the screen names are logged into the communication server. In some implementations, the communication server 110 analyzes the screen name(s) associated with the content provider to determine if the any of the screen names are "available." The predetermined number of content providers can be any appropriate number, such as the five content providers determined to be the most responsive to the provider query.

If a predetermined number of content providers are not online, then additional content providers can be selected until the predetermined number of content providers is reached (at 506).

If the predetermined number of content providers are online, then a two way communication interface can be provided to the user device (at 508). For example, the content delivery system 110 can provide an interface similar to the two-way communication interfaces 202 and 212 on the user device 102 such that the user can communicate with any of the predetermined number of content providers. In some implementations, a separate window or interface that includes the two-way communication interface is generated on the user device 102. In some implementations, the two-way communication interface is displayed below or near the provider search field 230. The user can then initiate a two-way communication session with the content provider or its representative. In some implementations, the two way communication interface can be provided to the user device if at least one content provider responsive to the provider query is online.

Figure 6:
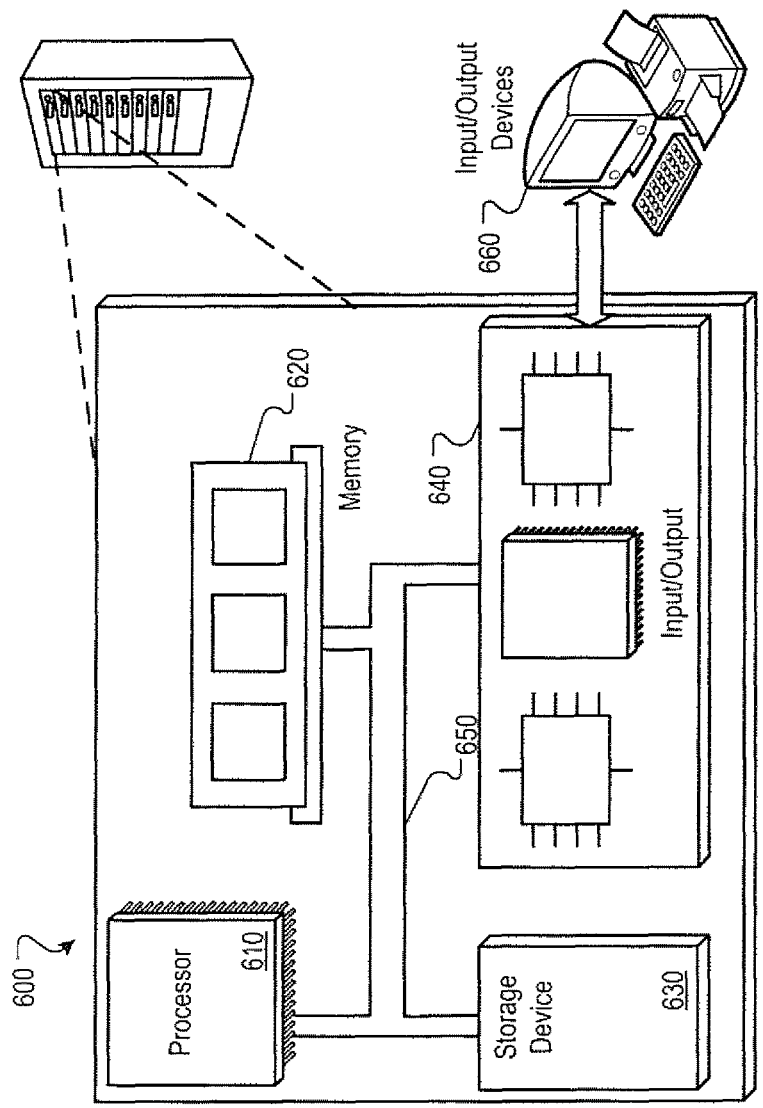
FIG. 6 is a block diagram of an example computer system that can be used to implement the classification system.

FIG. 6 is block diagram of an example computer system 600 that can be used to implement the content delivery system 108. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The various functions of the content delivery system 108 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The classification system 106 can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Although a few implementations have been described in detail above, other modifications are possible. For example, with respect to FIG. 4, determining whether the content provider is relevant to the user can be an optional step and not implemented. Moreover, other processes for training a classification model can be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by a content delivery server including one or more processors, a request for content from a user device;
selecting, by the content delivery server, an advertisement content item for delivery responsive to the request;
identifying, by the content delivery server, a communication identifier of a third party content provider corresponding to the advertisement content item selected for delivery;
determining, by the content delivery server via a communications server, that the third party content provider is available for a two-way communication session; and
providing, by the content delivery server, responsive to determining that the third party content provider is available for the two-way communication session, a two-way communication interface for a user to communicate with the third party content provider associated with the advertisement content item along with the selected advertisement content item, the selected advertisement content item including a text input field to receive input to deliver to the third party content provider via the two-way communication interface, the two-way communication interface configured to cause a communication client executing on the user device to establish a communication session with a corresponding communication client executing on a device of the third party content provider via the communications server responsive to receiving an input in the text input field of the advertisement content item.

2. The computer-implemented method of claim 1 wherein the third party content provider is different from an entity that operates the content delivery server.

3. The computer-implemented method of claim 1, wherein determining that the third party content provider is available for a two-way communication session includes determining an online status associated with the third party content provider before providing the two-way communication interface.

4. The computer-implemented method of claim 1 further comprising:
determining a geographic area associated with the request for content from the user device,
wherein providing the two-way communication interface further comprises providing the two-way communication interface if the third party content provider provides services in the geographic area.

5. The computer-implemented method of claim 4 wherein determining the geographic area comprises determining the geographic area associated with an IP address from which the request for content from the user device originated.

6. The computer-implemented method of claim 4 wherein the geographic area comprises a user-specified geographic area provided with the request for content from the user device.

7. The computer-implemented method of claim 1 wherein the two-way communication interface comprises an instant messaging interface.

8. The computer-implemented method of claim 1 further comprising displaying a visual element of the two-way communication interface adjacent to the advertisement content item.

9. A computer-implemented method comprising:
receiving, by a content delivery server including one or more processors, a request for a content provider; and
selecting a particular third party content provider from a plurality of content providers, wherein the particular content provider is selected responsive to the request;
identifying a communication identifier of the particular content provider;
determining, via a communications server, that the particular third party content provider is available for a two-way communication session, the particular content provider associated with a two-way communication account; and
in response to the request, providing, responsive to determining that the third party content provider is available for the two-way communication session, a two-way communication interface for a user to communicate with the particular content provider, providing the two-way communication interface includes displaying a text input field to receive input to deliver to the particular content provider via the two-way communication interface, the two-way communication interface configured to cause a communication client executing on the user device to establish a communication session with a corresponding communication client executing on a device of the third party content provider via the communications server responsive to receiving an input in the text input field of the two-way communication interface,
wherein the two-way communication account comprises an online status indicator, and
wherein the online status indicator has a value indicative of whether the content provider is available to communicate with the user.

10. The computer-implemented method of claim 9, wherein the request for a content provider includes at least one keyword associated with the content provider.

11. The computer-implemented method of claim 9 wherein the two-way communication interface comprises an instant messaging interface.

12. The computer-implemented method of claim 9, wherein selecting the particular content provider comprises analyzing keywords associated with the content provider.

13. The computer-implemented method of claim 12, wherein selecting the particular content provider further includes analyzing keywords associated with online content associated with the content provider.

14. A system comprising:
a third party content provider database including a content item associated with a third party content provider and one or more keywords associated with the third party content provider;
a communication server including an online status associated with the third party content provider;
a content delivery server coupled to the third party content provider database and the communication server, wherein the content delivery server is configured to:
receive a request for content from a user device;
select an advertisement content item, from the content provider database, for delivery responsive to the request;
identify a communication identifier of the third party content provider corresponding to the advertisement content item selected for delivery;
determine, via the communications server, that the third party content provider is available for a two-way communication session; and
provide, responsive to determining that the third party content provider is available for the two-way communication session, a two-way communication interface for a user to communicate with the third party content provider associated with the selected advertisement content item along with the selected advertisement content item, the selected advertisement content item including a text input field to receive input to deliver to the third party content provider via the two-way communication interface, the two-way communication interface configured to cause a communication client executing on the user device to establish a communication session with a corresponding communication client executing on a device of the third party content provider via the communications server responsive to receiving an input in the text input field of the advertisement content item.

15. The system of claim 14 wherein the online status comprises an indication of whether the content provider is available to participate in a two-way communication session.

16. The system of claim 14 wherein determining that the third party content provider is available for a two-way communication session includes determining, via the communications server, the online status associated with the third party content provider before providing the two-way communication interface.

17. The system of claim 14 wherein the content delivery server is further configured to:
determine a geographic area associated with the request for content,
wherein providing the two-way communication interface further comprises providing the two-way communication interface if the third party content provider provides services in the geographic area.

18. A non-transitory computer readable medium encoded with a computer program comprising instructions that, when executed, operate to cause a computer to:
receive a request for content from a user device;
select an advertisement content item for delivery responsive to the request;
identify a communication identifier of the third party content provider corresponding to the advertisement content item selected for delivery;
determine, via a communications server, that the third party content provider is available for a two-way communication session; and
provide, responsive to determining that the third party content provider is available for the two-way communication session, a two-way communication interface for a user to communicate with the third party content provider associated with the advertisement content item along with the selected advertisement content item, the selected advertisement content item including a text input field to receive input to deliver to the third party content provider via the two-way communication interface, the two-way communication interface configured to cause a communication client executing on the user device to establish a communication session with a corresponding communication client executing on a device of the third party content provider via the communications server responsive to receiving an input in the text input field of the advertisement content item.

19. The computer readable medium of claim 18 further comprising instructions that, when executed, cause the computer, in determining that the third party content provider is available for the two-way communication session, to determine an online status associated with the third party content provider before providing the two-way communication interface.

20. The computer readable medium of claim 18 further comprising instructions that, when executed, cause the computer to:
- determine a geographic area associated with the request for content,
- wherein providing the two-way communication interface further comprises providing the two-way communication interface if the third party content provider provides services in the geographic area.

* * * * *